US012660023B2

(12) United States Patent
Chen et al.

(10) Patent No.: US 12,660,023 B2
(45) Date of Patent: Jun. 16, 2026

(54) ELECTRONIC DEVICE WIRELESS CONNECTIONS

(71) Applicant: Hewlett-Packard Development Company, L.P., Spring, TX (US)

(72) Inventors: Chung-Chun Chen, Taipei City (TW); Chen-Hui Lin, Taipei City (TW); Chih-Ming Huang, Taipei City (TW); Ming-Shien Tsai, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 369 days.

(21) Appl. No.: 18/263,107

(22) PCT Filed: Feb. 2, 2021

(86) PCT No.: PCT/US2021/016166
§ 371 (c)(1),
(2) Date: Jul. 26, 2023

(87) PCT Pub. No.: WO2022/169439
PCT Pub. Date: Aug. 11, 2022

(65) Prior Publication Data
US 2024/0090053 A1     Mar. 14, 2024

(51) Int. Cl.
*H04W 76/15* (2018.01)
*H04W 12/06* (2021.01)
*H04W 76/14* (2018.01)

(52) U.S. Cl.
CPC ........... *H04W 76/15* (2018.02); *H04W 12/06* (2013.01); *H04W 76/14* (2018.02)

(58) Field of Classification Search
CPC ....... H04W 4/80; H04W 12/06; H04W 76/15; H04W 84/12
See application file for complete search history.

(56) References Cited

U.S. PATENT DOCUMENTS

| | | | |
|---|---|---|---|
| 8,239,605 B2 | 8/2012 | Lydon et al. | |
| 8,554,924 B2 | 10/2013 | Holden et al. | |
| 8,948,697 B2 | 2/2015 | Liao et al. | |
| 9,125,002 B2 | 9/2015 | Park | |
| 2014/0080469 A1 | 3/2014 | Ko et al. | |
| 2014/0323049 A1 | 10/2014 | Park et al. | |
| 2015/0351144 A1 | 12/2015 | Chi et al. | |
| 2016/0381717 A1* | 12/2016 | Sunagar | H04B 17/318 |
| | | | 370/328 |
| 2017/0006654 A1 | 1/2017 | Stice et al. | |
| 2019/0364036 A1 | 11/2019 | Simpson et al. | |
| 2020/0019255 A1 | 1/2020 | Gilbert et al. | |

* cited by examiner

*Primary Examiner* — Sam Bhattacharya
(74) *Attorney, Agent, or Firm* — Quarles & Brady LLP

(57) ABSTRACT

In one example in accordance with the present disclosure, an electronic device is described. The electronic device includes a wireless controller. The wireless controller is to establish a first wireless connection between the electronic device and a peripheral device to receive a unique identifier for a second electronic device. The wireless controller is also to establish, based on the unique identifier for the second electronic device, a second wireless connection between the electronic device and the second electronic device. The electronic device includes a wireless transceiver to wirelessly transfer data to the second electronic device through the second wireless connection.

18 Claims, 5 Drawing Sheets

Electronic Device
100

Wireless Controller
102

Wireless Transceiver
104

*Fig. 1*

Electronic Device
100

Wireless Controller
102

Wireless Transceiver
104

Connection Controller
206

*Fig. 2*

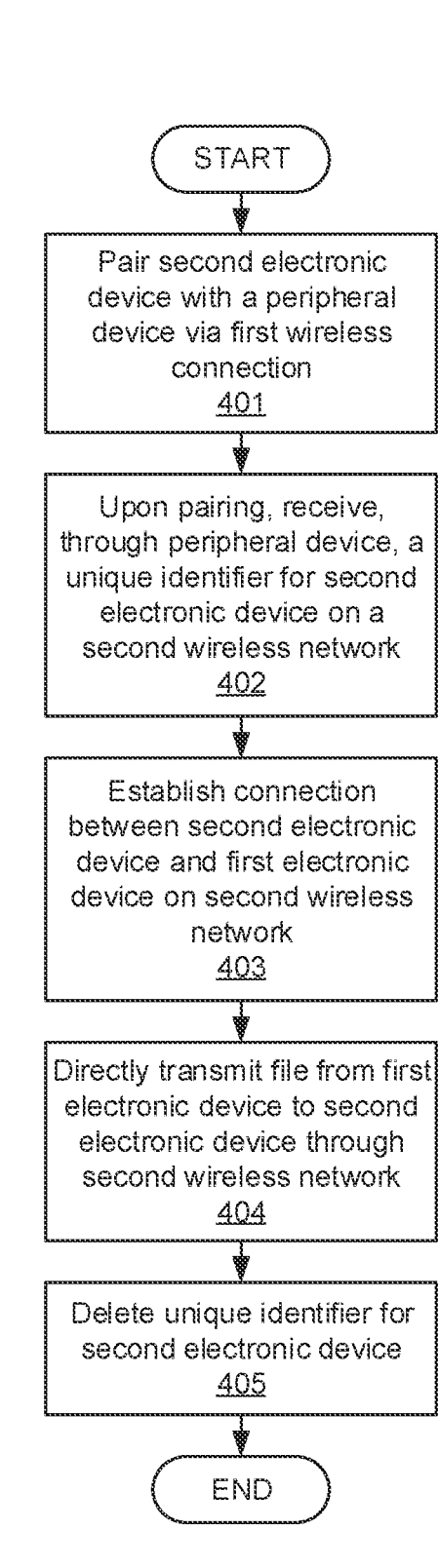

400

START

Pair second electronic device with a peripheral device via first wireless connection
401

Upon pairing, receive, through peripheral device, a unique identifier for second electronic device on a second wireless network
402

Establish connection between second electronic device and first electronic device on second wireless network
403

Directly transmit file from first electronic device to second electronic device through second wireless network
404

Delete unique identifier for second electronic device
405

END

*Fig. 4*

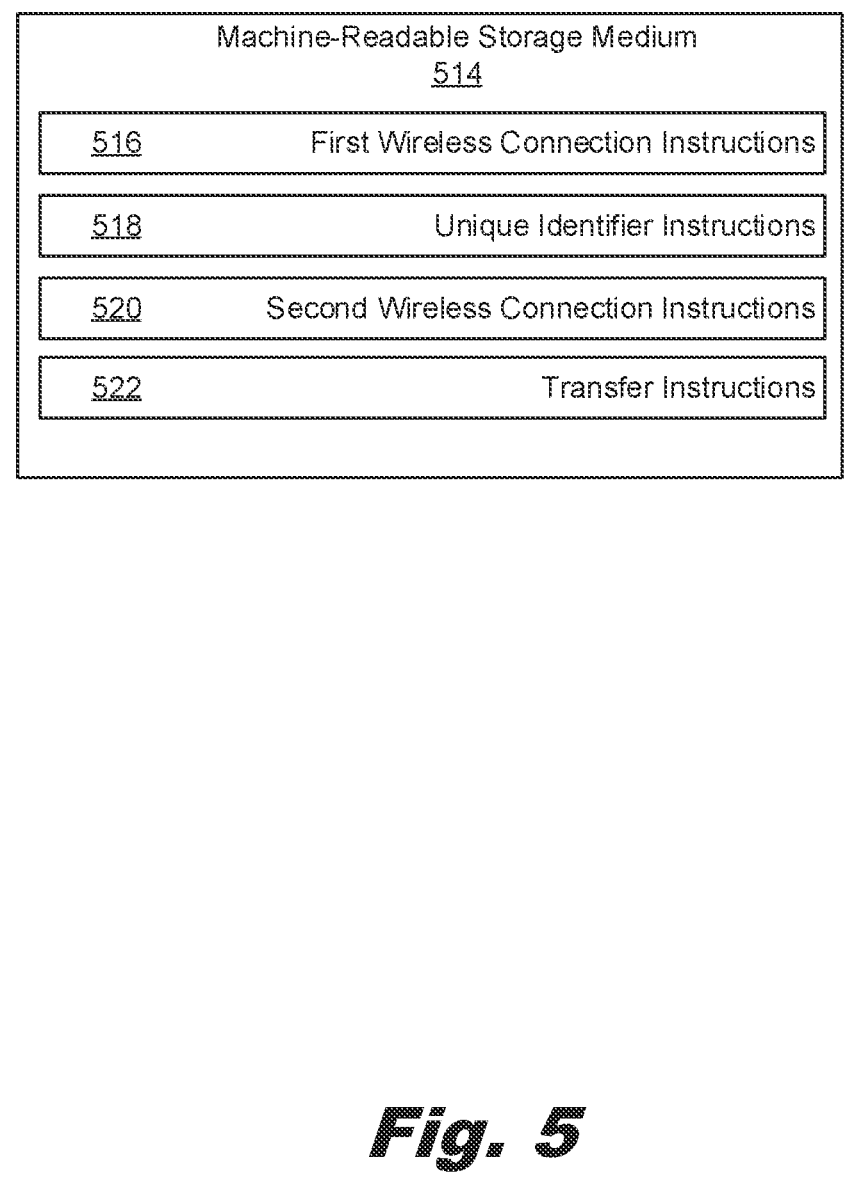

Machine-Readable Storage Medium
514

| 516 | First Wireless Connection Instructions |
| 518 | Unique Identifier Instructions |
| 520 | Second Wireless Connection Instructions |
| 522 | Transfer Instructions |

*Fig. 5*

ELECTRONIC DEVICE WIRELESS CONNECTIONS

BACKGROUND

Electronic devices include wireless transceivers to transmit information between electronic devices that are not physically connected to one another. A variety of types of information could be shared across such wireless connections. One example of a wireless network is a Wi-Fi network. Another example of a wireless network is a short-range low power connection, such as a BLUETOOTH network.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 1 is a block diagram of an electronic device to manage wireless connections, according to an example.

FIG. 2 is a block diagram of an electronic device to manage wireless connections, according to an example.

FIG. 4 is a flowchart of a method for managing electronic device wireless connections, according to an example.

FIG. 5 depicts a non-transitory machine-readable storage medium for managing electronic device wireless connections, according to an example.

Figure 3:
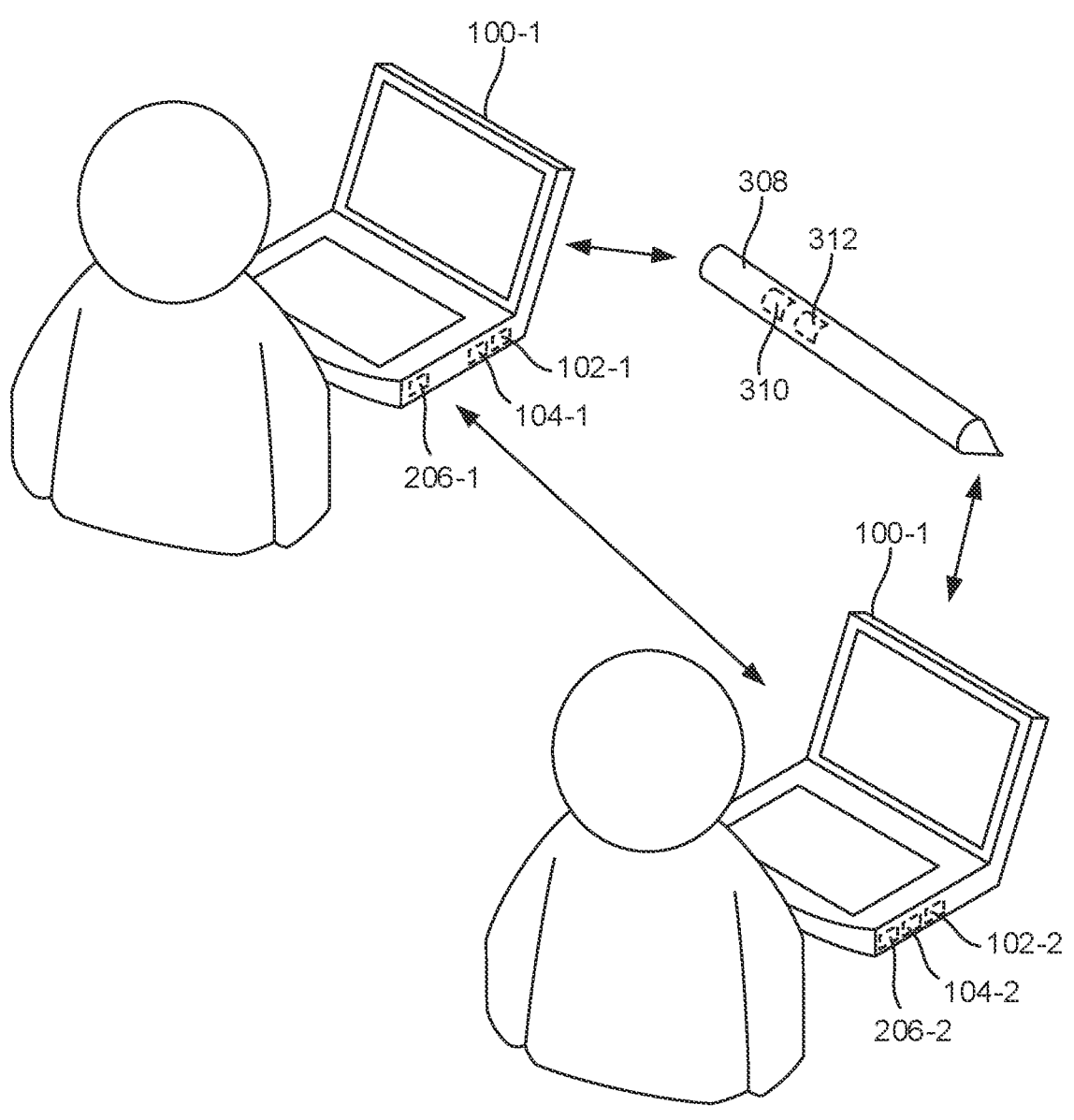
FIG. 3 is a diagram of electronic devices that communicate wirelessly with one another, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices may include any number of wireless transceivers to facilitate wireless communication. With such wireless transceivers, different electronic devices may communicate with one another and may be able to transfer data. For example, a first electronic device may transmit a digital file to a second electronic device. Electronic devices may also receive and transmit information and data via wired mechanisms. For example, two computers may be connected via a physical cable and may transfer the information therebetween. While each of these mechanisms, i.e., wireless and wired, greatly increase the ability to transfer data, certain characteristics impact their use in modern society.

For example, a physical cable may provide a secure connection, but may be cumbersome and inconvenient and may prevent the sharing of data altogether. For example, if a user does not have a physical cable to connect the computers, the users may be unable to share data. Moreover, a physical cable may be impractical for computing devices that are farther apart than a length of the cable, as one of the electronic devices would have to be moved to be within reach of the cable. Accordingly, data transfer via cable is potentially cumbersome to the point of preventing data transfer between electronic devices.

As for wireless connections, some wireless connections may have low data transmission rates and/or be susceptible to security attacks. For example, one type of wireless connection is a short-range low power connection, such as a BLUETOOTH connection. While a BLUETOOTH connection may be secure, it may have low data transmission rates such that data transmission is limited to small files.

In yet another example of a wireless connection, computers or other electronic devices may be connected via a Wi-Fi connection. However, Wi-Fi connections through an access point may be susceptible to security breaches. In a Wi-Fi connection, both electronic devices connect to a wireless access point and share the data across the wireless access point. However, a malicious user may generate a false address for the access point such that a first user connects not to an intended access point, but the access point replicated by the hacker. As such, the first user is not sending the data to the secure wireless access point, but to the false access point. Thus, any data transferred may be stolen and exploited by the malicious user.

Accordingly, the present specification describes components to allow a first electronic device and second electronic device to securely and reliably transfer information wirelessly, by utilizing wireless peripheral devices paired to the electronic devices that desire to share information. Wireless peripheral devices such as styluses, keyboards, and mouses may be paired with electronic devices. The present specification provides a more secure way to share files between the first electronic device and the second electronic device via a secure wireless connection facilitated by sharing a unique identifier of the second electronic device with the first electronic device via a first wireless connection and transmitting data via a second wireless connection established based on the securely transmitted unique identifier.

As a specific example, a first user may intend to share a file with a second user and may have a wireless peripheral device such as a BLUETOOTH stylus paired with a computer of the first user, i.e., a first computer. In this example, the second user may also pair their computer, i.e., a second computer, with the BLUETOOTH stylus. A communication controller on the second computer may detect such a pairing and transmit a unique identifier for the second computer to the first computer through the BLUETOOTH stylus. A wireless connection, which may be different than the BLUETOOTH wireless connection between the peripheral device and the computers, is then established between the first computer and the second computer based on the unique identifier obtained through the BLUETOOTH stylus. The first computer may then transfer the file to the second computer over this second, non-BLUETOOTH, wireless connection.

Specifically, the present specification describes an electronic device. The electronic device includes a wireless controller. The wireless controller establishes a first wireless connection between the electronic device and a peripheral device to receive a unique identifier for a second electronic device. Based on the unique identifier for the second electronic device, the wireless controller establishes a second wireless connection between the electronic device and the second electronic device. The electronic device also includes a wireless transceiver to wirelessly transfer data to the second electronic device through the second wireless connection.

In another example, the electronic device includes the wireless controller to establish the first wireless connection. In this example, the first wireless connection is 1) between the electronic device and a peripheral device and 2) the first wireless connection is a low-power short range wireless connection. The wireless controller also receives a unique identifier of a second electronic device through the wireless peripheral device and establishes, based on the unique identifier, a second wireless connection with the second electronic device. This second wireless connection is 1) between the electronic device and the second electronic device and 2) of a different type than the first wireless connection. In this example, the electronic device includes the wireless transceiver to wirelessly transfer data to the second electronic device through the second wireless connection.

In yet another example, the electronic device includes the wireless controller to 1) establish a first wireless connection between the electronic device and a peripheral device of a transmitting electronic device and 2) establish a second wireless connection between the electronic device and a first electronic device, wherein the second wireless connection is of a different type than the first wireless connection. The electronic device may include a connection controller to, responsive to establishing the first wireless connection, transmit a unique identifier of the electronic device to the first electronic device, which unique identifier is to establish the second wireless connection. The electronic device also includes the wireless transceiver to wirelessly receive data from the first electronic device through the second wireless connection.

As used in the present specification and in the appended claims, the term, "controller" may be a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Figure 1:
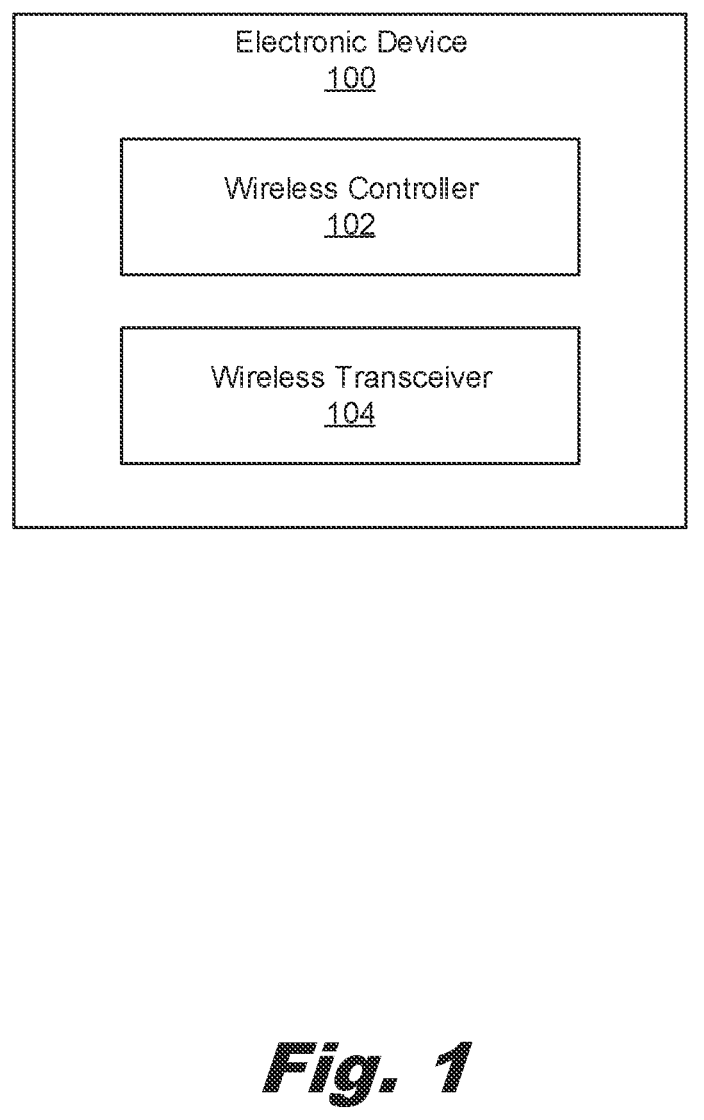

Turning now to the figures, FIG. 1 is a block diagram of an electronic device 100 to manage wireless connections, according to an example. The electronic device 100 may be of a variety of types including a desktop computer, a laptop computer, a tablet, a smart phone, or any other electronic device 100 or any other electronic device 100 that includes a wireless transceiver 104.

As described above, electronic devices 100 have wireless transceivers 104 to wirelessly communicate with other electronic devices. In an example, an electronic device 100 includes different types of wireless transceivers 104 to communicate via different wireless protocols. For example, a first wireless transceiver may be a BLUETOOTH transceiver which is a low-power short-range wireless transceiver that allows for transfer of small amounts of data over short ranges. As another example, a second wireless transceiver may be a Wi-Fi transceiver that allows for communication of larger data files over greater distances. Each wireless transceiver may be tailored for different uses. For example, a BLUETOOTH transceiver may be used for certain types of communications while a second transceiver may be implemented for other types. Specifically, the BLUETOOTH transceiver may be used for sharing small size data packets over a short range wherein a Wi-Fi transceiver may be used for sharing larger data files over larger distances. The present electronic device 100 implements both types of communication protocols to ensure secure and efficient wireless transfer of information such as digital files.

Accordingly, the electronic device 100 includes a wireless controller 102. As described above, the wireless controller 102 refers to various hardware components, which include a processor and memory. The processor includes the circuitry to retrieve executable code from the memory and execute the executable code. The wireless controller 102 is to establish different wireless connections for the electronic device 100.

Specifically, the wireless controller 102 establishes a first wireless connection between the electronic device 100 and a peripheral device. In some examples, the peripheral device may be a human interface device such as a stylus, keyboard, or mouse. While particular reference is made to particular peripheral devices, other types of peripheral devices may be implemented in accordance with the principles described herein.

Such a connection may be established via a pairing operation. In such an example, a peripheral device may be placed in a discoverable mode, which broadcasts an identifier and other information for the peripheral device such that other devices within range may be able to detect the presence of the peripheral device and attempt to establish a connection. The electronic device 100 scans for discoverable devices and discovers the peripheral device and acquires configuration information for the peripheral device. Upon authorization or automatically, the electronic device 100 then pairs with the peripheral device such that a data connection is established.

As described above, such a connection may be a BLUETOOTH connection, and directly between the electronic device 100 and the peripheral device such that any data transmission therebetween is secure and protected against malicious intervention. In this example, the wireless controller 102 includes a BLUETOOTH controller. Through this secure connection, a unique identifier for a second electronic device is received. That is, the peripheral device may not only pair with the electronic device 100, but the peripheral device may also pair with a second electronic device through a similar pairing process.

Responsive to the second electronic device pairing with the peripheral device, the second electronic device may transmit to the peripheral device a unique identifier for the second electronic device. This unique identifier is then transmitted onto the electronic device 100. This unique identifier may identify the second electronic device in a second wireless network. That is, a BLUETOOTH connection from the electronic device 100 to the second electronic device through the peripheral device may not facilitate transmissions of large digital files. Accordingly, it may be desired to establish a second wireless connection between the electronic device and the second electronic device to facilitate transfer of larger files. Accordingly, by providing the first electronic device with a unique identifier of the second electronic device, a second, and higher bandwidth, wireless connection may be established between the two electronic devices. Accordingly, the unique identifier may uniquely identify the second electronic device on this second network.

The wireless controller 102 may then establish a second wireless connection based on this unique identifier for the second electronic device. This second wireless connection may be directly with the second electronic device. That is, the first wireless connection, e.g., a BLUETOOTH connection, may be between the electronic device 100, the peripheral device, and the second electronic device whereas the second wireless connection may be between the electronic device and the second electronic device without a peripheral intermediary.

As described above, the different wireless connections may be different from one another in a variety of ways. For example, the first wireless connection may be a low-power short range wireless connection, such as a BLUETOOTH connection, that is between the electronic devices and has a peripheral device intermediary. By comparison, the second wireless connection is between the electronic device and the second electronic device without a peripheral intermediary and may be of a different type than the first wireless connection. Specifically, the first wireless connection may have a lower bandwidth than the second wireless connection. Moreover, the second wireless connection may have a wider transmission range and/or a larger data transmission rate as compared to the first wireless connection.

As a particular example, the first wireless connection may be a BLUETOOTH connection while the second wireless connection may be a Wi-Fi direct connection. As such, the wireless controller 102 may include a BLUETOOTH controller and a Wi-Fi controller. A Wi-Fi direct connection refers to a Wi-Fi connection that does not include an intermediary Wi-Fi access point, and is therefore a peer-to-peer connection. The Wi-Fi direct connection may have data transmission speeds of up to 2 gigabytes per second as compared to the BLUETOOTH connection which may haves a speed of around 50 megabytes per second. The first wireless connection may have a lower power consumption as compared to the second wireless connection. For example, the BLUETOOTH connection may consume 0.01 Watts of power, while a Wi-Fi direct connection may consume as much as 20 Watts of power. Still further, the second wireless connection may have a greater transmission range as compared to the first wireless connection. For example, the Wi-Fi direct connection may have transmission ranges of over 600 feet while a BLUETOOTH connection may have a range of around 200 feet.

The Wi-Fi direct connection provides enhanced security over a Wi-Fi connection that implements an access point. This is due to the susceptibility of an access point to a security breach. For example, the access point may be compromised as a malicious user replicates the service set identifier (SSID) of the access point. In this scenario, the malicious user may collect and steal any information shared across the fraudulent access point. While particular reference is made to particular wireless connections, a variety of other connections may be implemented in accordance with the principles described herein.

Accordingly, the wireless controller 102 provides for sharing of digital files across a high-bandwidth wireless connection, while ensuring a secure connection, via the establishing of a direct second wireless connection based on a unique identifier transmitted via a secure first wireless connection.

The electronic device 100 also includes a wireless transceiver 104 to wirelessly transfer data to the second electronic device through the second wireless connection. In an example, the electronic device 100 also includes another wireless transceiver 104 to wireless transfer data to the peripheral device over the first wireless connection.

Figure 2:
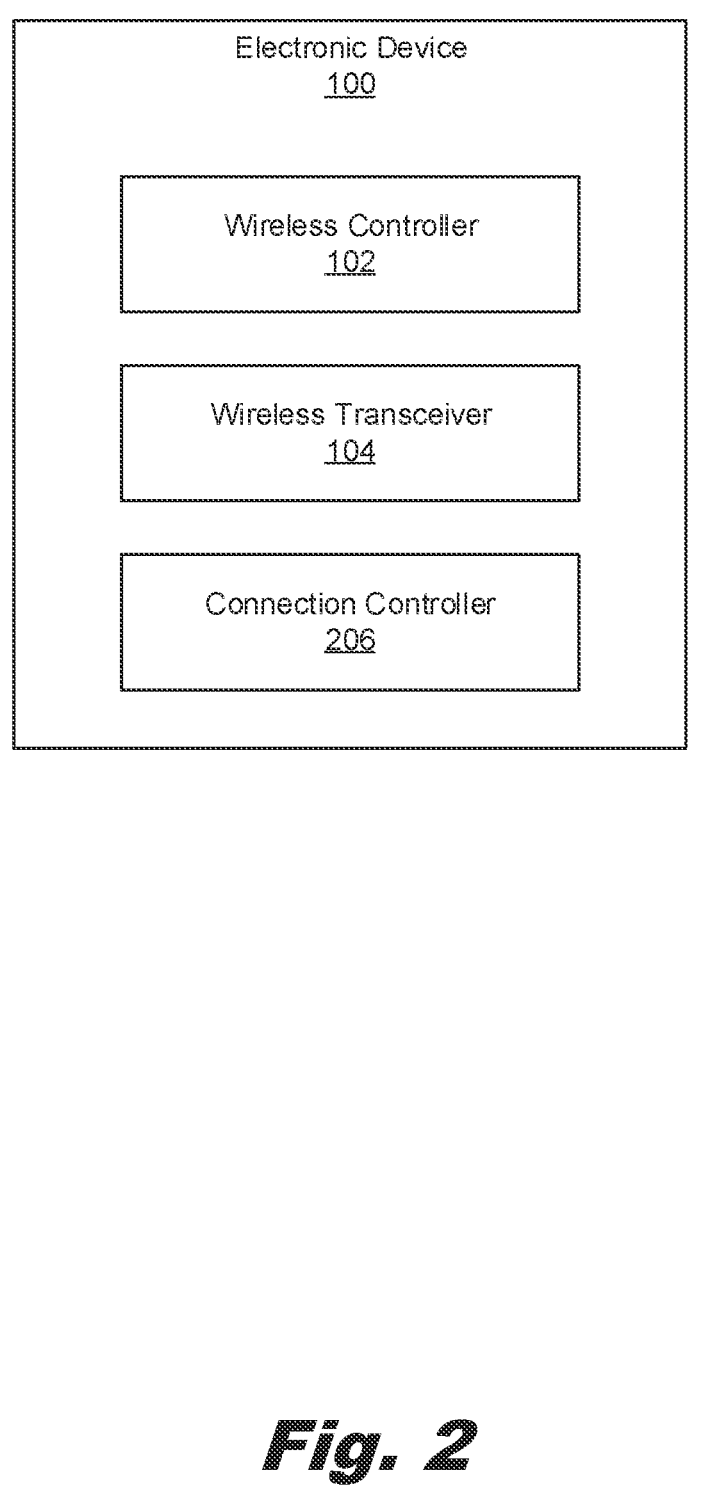

FIG. 2 is a block diagram of an electronic device 100 to manage wireless connections, according to an example. In addition to the wireless controller 102 and the wireless transceiver 104, the electronic device 100 also includes a connection controller 206 which aids in the establishment of the second wireless connection between a first and second electronic device.

It should be noted that the electronic device 100 depicted in FIGS. 1 and 2 may be either the first electronic device, which is initially paired with a peripheral device or a second electronic device, which is subsequently paired to the peripheral device. That is, the electronic device 100 may be either a transmitting or a receiving electronic device.

In some examples, the wireless controller 102 of the electronic device 100 establishes a first wireless connection between the electronic device 100 and the peripheral device and receives a unique identifier of a second electronic device. In an example, the wireless controller 102 of the electronic device 100 establishes a wireless connection with the peripheral device that has been paired with a first electronic device. That is, the first electronic device may pair with the peripheral device. At a later point in time, the second electronic device pairs with the peripheral device that previously has been paired with the first electronic device.

Responsive to establishing a first wireless connection with the peripheral device, the connection controller 206 of the second electronic device may transmit a unique identifier, which is used to establish the second wireless connection. Then as described above, the wireless transceiver 104 of the second electronic device wirelessly receives data from the first electronic device through the second wireless connection.

The connection controller 206 may also request an authorization for the user to transmit the unique identifier for the electronic device. That is, responsive to a second electronic device pairing with the peripheral device, the connection controller 206 may prompt the user with a request for authorization to transmit the unique identifier to the first electronic device, rather than automatically transmitting the unique identifier.

The connection controller 206 may also delete any received unique identifiers. For example, maintaining a unique identifier of one electronic device 100 on another electronic device may present a security liability. In this example, the connection controller 206 on an electronic device 100 which received a unique identifier of another electronic device may delete the unique identifier. Specifically, the connection controller 206 may, responsive to detecting that the second electronic device is outside a transmission range of the first wireless connection, e.g., outside a BLUETOOTH range, or the second wireless connection, e.g., outside the Wi-Fi direct range, may delete, from the first electronic device, the unique identifier of the second electronic device.

FIG. 3 is a diagram of electronic devices 100-1, 100-2 that communicate wirelessly with one another, according to an example. As depicted in FIG. 3, a first electronic device 100-1 may be initially paired with a peripheral device 308, which in this example is a BLUETOOTH stylus, used with the first electronic device 100-1. That is, at some point in time, the peripheral device 308 may have been paired with the first electronic device 100-1. Accordingly, the peripheral device 308 may include a wireless transceiver 310, such as a BLUETOOTH transceiver, to transmit data via a corresponding wireless network. The peripheral device 308 may also include a wireless controller 312 to manage wireless communication across the wireless network. In the example, where the first wireless connection is a BLUETOOTH connection, the wireless controller 312 may include a BLUETOOTH controller.

At some subsequent point in time, the peripheral device 308 may be paired with the second electronic device 100-2. That is, the second electronic device 100-2 may come within the transmission range of the communication protocol of the peripheral device 308. Either automatically or responsive to user input, the second electronic device 100-2 may pair with the peripheral device 308. In some examples, the wireless controller 102-1 of the first electronic device 100-1 requests, from a user of the first electronic device 100-1, authentication of the second electronic device 100-2 to pair with the peripheral device 308. Doing so may ensure that just identified and desired electronic devices 100 may establish a pairing with the peripheral device 308 of the first electronic device 100-1.

Responsive to the second electronic device 100-2 pairing with the peripheral device 308, the connection controller 206-2 of the second electronic device 100-2 transmits a unique identifier to the peripheral device 308 through the first wireless connection, which may be a BLUETOOTH connection. In some examples, the unique identifier may be a media access control (MAC) address for the second electronic device 100-2. The peripheral device 308 then transmits this unique identifier to the first electronic device 100-1 again through the first wireless connection. In some examples, the transmission, reception, and handling of the unique identifier may be performed in a background of the operating system, such that a user may not be notified of such.

With the unique identifier of the second electronic device 100-2 identified, the first electronic device 100-1 may establish a direct wireless connection with the second electronic device 100-2 without the peripheral device 308 intermediating the communication. As described above, such a second wireless connection may facilitate transferring larger files across greater distances and may be secure as there is no intermediate wireless access point that is susceptible to security breaches. This direct connection is facilitated by the first network communication of the unique identifier of the second electronic device 100-2.

Once the second electronic device 100-2 is outside of the first wireless network (e.g., BLUETOOTH) range or the second wireless network (e.g., Wi-Fi Direct) range, the communication controller 206-1 on the first electronic device 100-1 may delete the unique identifier of the second electronic device 100-2 as a security measure.

FIG. 4 is a flowchart of a method 400 for managing electronic device 100 wireless connections, according to an example. At step 401, the method 400 includes pairing a second electronic device 100-2 with a peripheral device 308. As described above, the peripheral device 308 may already be paired with a first electronic device 100-1. This pairing completes a first wireless connection between the first electronic device 100-1 and the second electronic device 100-2. Such a first wireless connection may allow for transferring small data packets over short range, for example, around 200 feet.

At step 402, the method 400 includes receiving a unique identifier for the second electronic device 100-2 through the peripheral device 308. In this example, the unique identifier may identify the second electronic device 100-2 on a second network, which second network has a higher data transmission rate, wider transmission range, and larger transmission bandwidth than the first wireless network.

At step 403, the method 400 includes, using the unique identifier of the second electronic device 100-2, a wireless controller 102-1 of the first electronic device 100-1, establishing a connection between the second electronic device

100-2 and the first electronic device 100-1. Specifically, the first electronic device 100-1 may use the unique identifier, for example a MAC address, to identify a second electronic device 100-2 that is in a discoverable mode. The first electronic device 100-1 may send a request for connection to the second electronic device 100-2 MAC address. The second electronic device 100-2 may respond to the request for connection with an acceptance. Following transmission of the acceptance packet, a connection is established across this second wireless network.

With a connection established across this second wireless network with greater bandwidth, at step 404 the method 400 includes directly transmitting a file to the second electronic device 100-2 through the second wireless network. Once the file transfer is complete, or once the second electronic device 100-2 is outside of either of the first wireless connection range or the second wireless connection range, at step 405 the method 400 includes deleting the unique identifier for the second electronic device 100-2 to enhance security.

FIG. 5 depicts a non-transitory machine-readable storage medium 514 for managing electronic device 100 wireless connections, according to an example. To achieve its desired functionality, an electronic device 100 includes various hardware components. Specifically, an electronic device 100 includes a processor and a machine-readable storage medium 514. The machine-readable storage medium 514 is communicatively coupled to the processor. The machine-readable storage medium 514 includes a number of instructions 516, 518, 520, 522 for performing a designated function. The machine-readable storage medium 514 causes the processor to execute the designated function of the instructions 516, 518, 520, 522. The machine-readable storage medium 514 can store data, programs, instructions, or any other machine-readable data that can be utilized to operate the electronic device 100. Machine-readable storage medium 514 can store computer readable instructions that the processor of the electronic device 100 can process, or execute. The machine-readable storage medium 514 can be an electronic, magnetic, optical, or other physical storage device that contains or stores executable instructions. Machine-readable storage medium 514 may be, for example, Random Access Memory (RAM), an Electrically Erasable Programmable Read-Only Memory (EEPROM), a storage device, an optical disc, etc. The machine-readable storage medium 514 may be a non-transitory machine-readable storage medium 514, where the term "non-transitory" does not encompass transitory propagating signals.

Referring to FIG. 5, first wireless connection instructions 516, when executed by the processor, cause the processor to, establish a wireless peripheral connection between an electronic device 100 and a peripheral device 308. Unique identifier instructions 518, when executed by the processor, may cause the processor to, responsive to the peripheral device 308 pairing with a second electronic device, receive through the peripheral device 308, a unique identifier for the second electronic device 100-2. The unique identifier is to identify the second electronic device 100-2 on a second wireless network. Second wireless connection instructions 520, when executed by the processor, may cause the processor to, establish a direct wireless connection between the electronic device 100-1 and the second electronic device 100-2 through the second wireless network based on the unique identifier. Transfer instructions 522, when executed by the processor, may cause the processor to, wirelessly transfer data to the second electronic device 100-2 through the second wireless network.

What is claimed is:

1. An electronic device, comprising:
a wireless controller to:
  establish a first wireless connection between the electronic device and a peripheral device to receive a unique identifier for a second electronic device; and
  establish, based on the unique identifier for the second electronic device, a second wireless connection between the electronic device and the second electronic device;
a wireless transceiver to wirelessly transfer data to the second electronic device through the second wireless connection; and
a connection controller to delete the unique identifier for the second electronic device.

2. The electronic device of claim 1, wherein:
the first wireless connection is a BLUETOOTH connection; and
the wireless controller comprises a BLUETOOTH controller.

3. The electronic device of claim 2, wherein the second wireless connection is directly between the electronic device and the second electronic device.

4. The electronic device of claim 1, wherein the unique identifier is a media access control (MAC) address.

5. The electronic device of claim 1, wherein the connection controller is to request an authorization to transmit the unique identifier for the electronic device.

6. The electronic device of claim 1, wherein the wireless controller is to request an authentication of the second electronic device to pair with the peripheral device.

7. The electronic device of claim 1, wherein the connection controller is to delete the unique identifier for the second electronic device responsive to a file transfer being complete.

8. The electronic device of claim 1, wherein the connection controller is to delete the unique identifier for the second electronic device responsive to the second electronic device being outside the second wireless connection range.

9. The electronic device of claim 1, wherein the electronic device requests user authentication of the second electronic device to pair with the peripheral device.

10. The electronic device of claim 1, wherein the electronic device identifies, with the unique identifier, that the second electronic device is in a discoverable mode and sends a request for connection to a media access control (MAC) address of the second electronic device.

11. The electronic device of claim 1, wherein the peripheral device is a stylus, keyboard, or mouse.

12. An electronic device, comprising:
a wireless controller:
  to establish a first wireless connection, wherein:
    the first wireless connection is between the electronic device and a peripheral device; and the first wireless connection is a low-power short range wireless connection; and
  receive a unique identifier of a second electronic device through the peripheral device; and
  establish, based on the unique identifier, a second wireless connection with the second electronic device, which second wireless connection is:
    between the electronic device and the second electronic device; and
    of a different type than the first wireless connection;
a wireless transceiver to wirelessly transfer data to the second electronic device through the second wireless connection; and
a connection controller to, responsive to detecting that the second electronic device is outside a transmission range of the first wireless connection from the peripheral device, delete the unique identifier of the second electronic device.

13. The electronic device of claim 12, wherein the second wireless connection has a wider transmission range than the first wireless connection.

14. The electronic device of claim 12, wherein the second wireless connection has a larger data transmission rate than the first wireless connection.

15. The electronic device of claim 12, wherein the peripheral device is a human interface device.

16. An electronic device, comprising:
a wireless controller to:
  establish a first wireless connection between the electronic device and a peripheral device of a first electronic device; and
  establish a second wireless connection between the electronic device and the first electronic device, wherein the second wireless connection is of a different type than the first wireless connection;
a connection controller to, responsive to establishing the first wireless connection, transmit a unique identifier of the electronic device, which unique identifier is to establish the second wireless connection, and to delete the unique identifier for the second electronic device; and
a wireless transceiver to wirelessly receive data from the first electronic device through the second wireless connection.

17. The electronic device of claim 16, wherein the first wireless connection has a lower bandwidth than the second wireless connection.

18. The electronic device of claim 16, wherein:
the first wireless connection is a BLUETOOTH connection; and
the second wireless connection is a Wi-Fi direct connection.

* * * * *